United States Patent [19]
Adams
[11] Patent Number: 4,581,442
[45] Date of Patent: Apr. 8, 1986

[54] PROCESS FOR DESTRUCTION OF TOXIC ORGANIC CHEMICALS AND THE RESULTANT INERT POLYMER BY-PRODUCT

[76] Inventor: Harold W. Adams, 189 Hattertown Rd., Newtown, Conn. 06470

[21] Appl. No.: 644,545
[22] Filed: Aug. 27, 1984
[51] Int. Cl.[4] ........................ C08J 11/00; C08J 11/02; C08J 11/04
[52] U.S. Cl. .................................... 528/389; 260/685; 521/40; 528/481; 570/204; 570/211
[58] Field of Search .......................... 521/40.5, 46, 40; 528/381, 387, 389, 481; 570/204, 211; 260/685

[56] References Cited

U.S. PATENT DOCUMENTS 3,793,235 2/1974 Goebel, Jr. ........................... 521/46
3,884,884 5/1975 Scoggins et al. .................... 528/389
3,919,177 11/1975 Campbell ............................ 528/389

*Primary Examiner*—Allan M. Lieberman
*Attorney, Agent, or Firm*—Howard I. Podell

[57] ABSTRACT

The invention is a chemical process for complete destruction and safe disposition of hazardous organic chemicals such as Polychlorinated Biphenyl (PCB). The invention also comprises the process for production of an inert polymer formed of essentially equal parts of Carbon and Sulfur, and also comprises the new inert polymer, itself and articles made of the new polymer. This new polymer has many of the properties of refractory materials and is an inert non-inflammable cross-linked polymer that is relatively insoluble in all generally known solvents. In the process of the invention PCB and Sulfur are heated, in an atmosphere of Nitrogen at 500° to 1500° C. Waste gases including sulfur and sulfides are condensed, scrubbed and the sulfur recycled. The solids residue when analyzed by a mass spectrometer contains less than one (1) part per million (1 ppm) of unreacted polychlorinated biphenyl (PCB).

21 Claims, 1 Drawing Figure

PROCESS FOR DESTRUCTION OF TOXIC ORGANIC CHEMICALS AND THE RESULTANT INERT POLYMER BY-PRODUCT

FIELD OF THE INVENTION

This invention relates generally to a process for the safe destruction of toxic and hazardous chemicals and for the conversion of such chemicals to a safe inert and useful non-toxic polymer by-product.

BACKGROUND OF THE INVENTION

At the present time, the storage of hazardous and toxic chemicals such as polychlorinated biphenyl may be a very costly procedure to industry. Failures to properly dispose of such toxic chemicals has resulted in long term devastating effects to both local and distant environments. Polychlorinated biphenyl compounds (PCB) have been of great use as an insulating oil in the electrical industry because of its known highly-stable properties under high temperature, but its carcinogenic properties has created difficult long term disposal problems since it is very stable, non-flammable and non-biodegradable. Because of its dangerous effect on the environment when accidentally released, electrical utility companies plan to spend millions of dollars in replacing PCB in capacitors and transformers, but such replacements are, in effect, creating an even more severe problem in the safe disposition of the discarded PCB. A long felt want in the chemical industry has been a safe and reliable process of conversion of such toxic chemicals to inert useful material which will itself have economic value.

STATEMENT OF THE PRIOR ART

The prior art is exemplified by the following patents, (U.S. except where otherwise noted): U.S. Pat. Nos. 3,523,812, 3,726,808, 3,835,183, 3,864,305, 2,175,816, 3,736,111, 3,622,265, 3,864,223, 74,127,954 (JAPAN).

Such art is generally illustrative of various processes and chemicals in the field of the invention. While such processes and chemicals are usually acceptable for their intended purposes, they have not proven to be satisfactory for the task of reliably converting 100% of a toxic chemical such as polyclorinated Biphenyl (PCB) into a completely inert compound. As a result of the shortcomings of the prior art, typified by the above, there has developed and continues to exist a substantial need for the process of the character described. Despite this need, and the efforts of many indviduals and companies to develop such processes, a satisfactory process meeting this need has heretofore been unavailable.

The principal object of this invention is to provide a process of this character which combines simplicity, and reliability together with inexpensiveness of operation and economies resulting from the sale of a useful inert by-product.

Other objects of this invention will in part be obvious and in part hereinafter pointed out.

SUMMARY OF THE INVENTION

The invention is a chemical process for complete destruction and safe disposition of hazardous organic chemicals and halogen-polymers such as PCB. The invention also resides in the process for production of an inert polymer formed of essentially equal parts of Carbon and Sulfur. The new Carbon-Sulfur polymer has many of the properties of refractory materials and is an inert non-flammable cross-linked polymer that is insoluble in organic solvents.

PCB and Sulfur is heated, in an atmosphere of Nitrogen at 500° to 1500° C. Waste gases containing sulfides are condensed, scrubbed and recycled. The solids residue when analyzed by a mass spectrometer contains less than one (1) part per million (1ppm) of unreacted polychlorinated biphenyl (PCB).

While the process of the invention will be described in terms of destruction of hazardous PCB, this same process is obviously effective in converting many other hydrocarbon polymers into an inert carbon/sulfide polymer refractory material.

DESCRIPTION OF THE BEST MODE OF THE INVENTION

Figure 1:
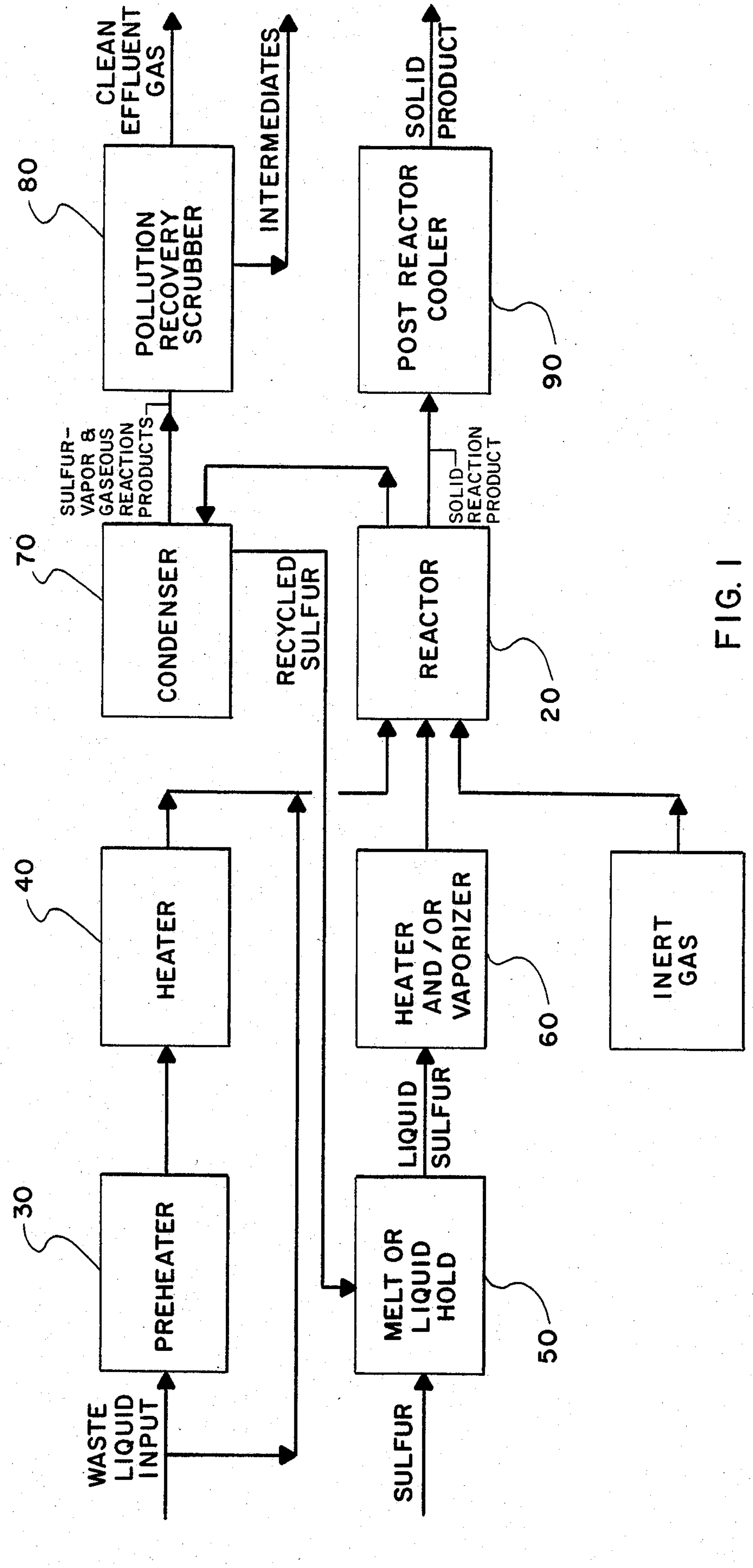
FIG. 1 is a block diagram of the process of the invention.

Turning now descriptively to the drawing, in which similar reference characters denote similar elements through out the view, FIG. 1 illustrates the process of the invention.

The chemical waste material to be destroyed, an organic chemical, or an organic chemical which is a halagen compound such as PCB, is added directly into reactor 20 or first heated in preheater 30 and heater 40 before being fed into the reactor 20. Fresh or recycled sulfur is into heated melt tank 50 in which it held in the melted condition and then fed into high temperature heater and or vaporizer tank 60 to be then fed into reactor 20. An inert gas such as nitrogen is also fed into the reactor 20 to maintain an inert oxygen-free atmosphere. Pressurized nitrogen gas may also be introduced into preheater 30, heater 40, melt tank 50 and high temperature tank 60 and employed to provide a pumping action to drive the waste liquid input and the sulfur into the reactor 20.

Reactor 20 is preferably rotating screw type oven and heated preferably by electric induction heating coils to maintain a temperature in the range of 500 degrees C. to 1500 degrees C. inside of the reactor. Within a matter of minutes at this temperature, and in less than 5 minutes, the organic chemical and sulfur or the PCB and sulfur have completely reacted together to produce a black solid material that contains less than 1 part per million of the organic chemical or unreacted PCB.

Further heating in the reactor, at the temperature range of 500 to 1500 degrees Celsius produces a black solid polymer product, the analysis of which, by weight, is as follows:

Carbon: 49.01%
Hydrogen: 0.67%
Sulfur: 48.79%
Unreacted PCB: $<$ 1 ppm by mass spectrometer This black solid polymer compound of substantially equal weights of Sulfur and Carbon, I call carbon/sulfur polymer or CSP. Although the exact molecular structure in terms of molar ratios of Sulfur to Carbon has not been established of CSP, the following properties have been demonstrated by actual tests:

When ground to a powder, it resembles appearance of carbon black

No observable melting point

Complete absorber of Ultra Violet and Infra-red light spectra
Not soluble in any known solvent
Not affected by Aqua Regia
An excellent electrical conductor These properties suit the following useful applications:

Filler for non-corrosive coatings
Filler for solar energy absorber devices
Filler in body implants to resist physical changes caused by human biological effects
Electronic resistor and conductive applications
Filler for cements and asphalt In particular, the combination of electrical conductive properties, and absorption of infra-red light (radiant heat energy) and inert chemical characteristics are particularly suited for solar energy conversion devices including devices for producing photo-galvanic and thermo-electric conversion.

Uses of the sulfur and carbon composition which is a product of the invention include its utilization as an absorber of heat radiation, its utilization as an absorber of other radiant energy, its utilization as a conductor of electricity, its utilization as a refractory material, as well as its utilization as an inert filler material, and its employment as a refractory material and as a filler in asphalt.

From the standpoint of ecomomy, the process reaction in reactor 20 is largely exothermic at the temperatures above 500 degrees C., and therefor the process supplies much of the necessary energy. Furthermore the current nation-wide ecological emphasis on the use of coal-fired plants and coal gasification results in production of increased quantities of waste Sulfur that may serve as a source of supply to feed my process. Thus my invention may be considered to use up two waste products, PCB and sulfur, to produce a new inert product of economic potential.

As shown in FIG. 1, the vapor products consisting of sulfur vapor, and hydrogen sulfide, carbon di-sulfide, sulfur-chloride gases are fed into a sulfur condenser 70 which recycles condensed sulfur back to the melt tank 50. The remaining gases are then fed into conventional pollution recovery scrubber equipment 80, producing clean effluent gas that may be passed into the atmosphere and conventional chemical intermediates. The solid reaction product of carbon/sulfur polymer is fed into post reactor cooler unit 90, and may be then transferred to appropriate grinding and mixing equipment as desired for further use of the product.

Other by-products of my process include gases of hydrogen sulfide ($H_2S$), carbon disulfide ($CS_2$) and sulfur chlorides ($S_xCl_2$) which may be recovered and removed from the effluent by conventional methods. Sulfur vapors are also recovered and condensed and recycled through the process. The organic chemical to be disposed of is normally fed onto the reactor at any temperature ranging from ambient to 650 degrees Celsius preferably through a nozzle or distributing spray although in some cases the feed temperature may range to 1100 degrees C. The sulfur is fed into the reactor as a melted liquid at a temperature ranging from about 135 degrees C. to about 450 degrees C. or fed into the reactor as a vapor at temperature ranging from about 450 degrees C. to 1500 degrees C. through a nozzle or spray nozzle. Pressure of the inert nitrogen gas in the reactor is preferably maintained between 1 and 2 atmospheres.

Estimates of the efficiency and costs of my process indicate that a plant can be constructed at a cost of $26,000,000.00 of a capacity to safely dispose of 24 tons per day of a PCB organic such as Westinghouse Company transformer oil "Inerteen 70-30" (ASTM specification D-2283 Type D). The operating costs of such a plant, not including interest and amortization nor credit for sale of by-product, would approximate $0.72 per pound of PCB destroyed. Including interest and amortization, the total costs per pound of PCB destroyed are estimated at $1.50 per pound, on the basis of a three year payout of investment.

It is thought that persons skilled in the art to which this invention relates will be able to obtain a clear understanding of the invention after considering the foregoing description in connection with the accompanying drawing. Therefor, a more lengthy description is deemed unnecessary. It is understood that various changes in shape, size, and arrangement of the elements of this invention as claimed may be resorted to in actual practice, if desired. While the process has been described in terms of conversion of Polychlorinated Biphenyl from a hazardous chemical to a useful inert material, it is equally appropriate for conversion, to an inert material, of other organic chemicals and polymers, including other halogen-hydrocarbon polymers by their reaction with sulfur at temperatures in the indicated range of 500 degrees C. to 1500 degrees C.

Having thus described the invention, what I claim as new and desire to secure by Letters Patent of the United States is:

1. A process for the substantial destruction of a halogen-carbon chemical to produce a relatively inert composition of matter comprising the following steps:

(a) Heating in a reactor under a substantially oxygen-free atmosphere at 500° C. to 1500° C., sulfur and the said chemical, so as to form a substantially inert solid composition which solid composition has little or no remaining residues of said halogen-carbon chemical and (b) Separating the resulting formed solid composition from any vapor phases in the reactor.

2. The process recited in claim 1, in which the said halogen-carbon chemical is a halogenated hydrocarbon polymer.

3. The process of claim 1, wherein the said inert solid composition consists essentially of sulfur and carbon.

4. The process recited in claim 1, in which step (a) is performed in an atmosphere of an inert gas such as nitrogen.

5. The process recited in claim 1, in which step (a) is carried out at a temperature approximating 500 degrees Celsius.

6. The process recited in claim 1, in which the said sulfur and the said chemical have been each pre-heated before being introduced into the reactor of step (a).

7. The process recited in claim 1, in which the said sulfur and the said chemical have already been combined together prior to being introduced into the reactor of step (a).

8. An inert solid material formed of substantially equal proportions by weight of sulfur and carbon which has been produced by the process recited in claim 1.

9. A process for the substantial destruction of polyclorinated biphenyl compounds comprising:

supplying said compounds to a reaction zone under a substantially Oxygen-free atmosphere at a temperature ranging from ambient to about 1100° C.;

feeding sulfur to said zone at a temperature ranging from about 135° C. to 1500° C. to form a substantially inert solid reaction product containing carbon and sulfur and to form gaseous products; and separating said inert solid product from said gaseous products.

10. The process of claim 9, further including the steps of flowing said gaseous products to a condensing zone and condensing sulfur in said products.

11. The process of claim 10, further including the step of recycling said sulfur to said reaction zone.

12. The process of claim 9, wherein said compounds are fed to said reaction zone at a temperature of ambient to 650° C.

13. The process of claim 9, wherein said sulfur is fed into said zone as a molten liquid at a temperature of about 135° C. to about 450° C.

14. The process of claim 9, wherein said sulfur is fed into said zone as a vapor at a temperature of about 450° C. to about 1500° C.

15. The process of claim 9, wherrein an inert gas is supplied to said reaction zone.

16. The process of claim 15, wherein said inert gas is nitrogen which is maintained under a pressure of 1 to 2 atmospheres.

17. The process of claim 1, wherein said sulfur is supplied as a molten liquid at a temperature of about 135° C. to about 450° C.

18. The process of claim 1, wherein said sulfur is fed as a gas at a temperature of about 450° C. to about 1500° C.

19. The process recited in claim 10, in which said step (1*a*) is continued for a period of time so as to produce a solid composition consisting of substantially equal proportions by weight of carbon and sulfur.

20. A substantially inert solid material formed by the reacting together of sulfur with material containing carbon at a temperature of 500° C. or more in a relatively oxygen-free atmosphere, which solid material is comprised of carbon and sulfur in approximate equal proportions by weight, said solid material being characterized as having no observable melting point, by being substantially unaffected by aqua regia, by being electrically conductive, and by containing little or no remaining residue of the said organic material containing carbon.

21. The material of claim 20, in which said solid material is characterized as being substantially solvent resistant in solvents known at this time.

* * * * *